(No Model.)

F. D. BLISS.
AXLE BOX.

No. 288,299. Patented Nov. 13, 1883.

Witnesses.
Daniel S. Glenney Jr.
Hiram A. Gray

Inventor,
Francis D. Bliss
by George Terry
Atty

UNITED STATES PATENT OFFICE.

FRANCIS D. BLISS, OF NEW HAVEN, CONNECTICUT.

AXLE-BOX.

SPECIFICATION forming part of Letters Patent No. 288,299, dated November 13, 1883.

Application filed June 11, 1883. (No model.)

*To all whom it may concern:*

Be it known that I, FRANCIS D. BLISS, a citizen of the United States of America, residing at New Haven, in the county of New Haven and State of Connecticut, have invented certain new and useful Improvements in Axle-Boxes, of which the following is a specification, reference being had therein to the accompanying drawings, in which—

Figure 1:
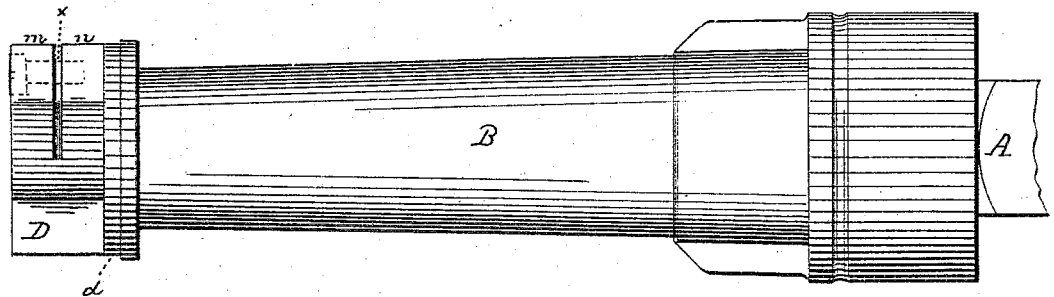
Figure 2:
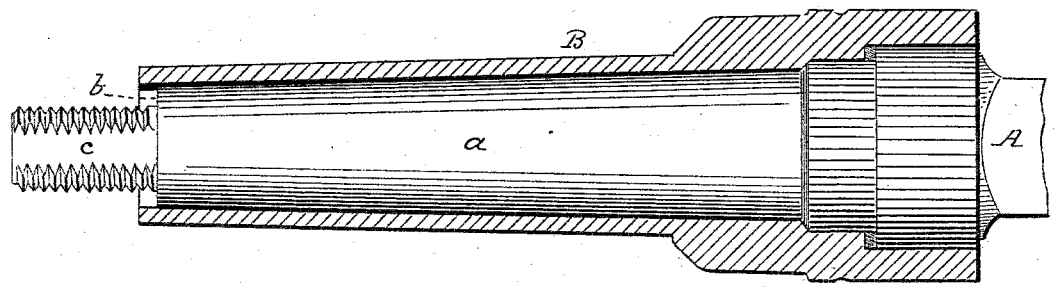
Figure 3:
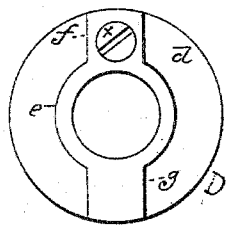
Figure 4:
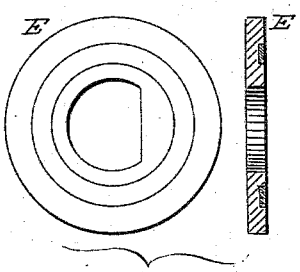
Figure 5:
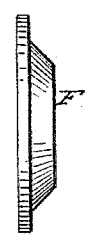

Figure 1 is a view of an axle-box, of a portion of an axle, and of a nut on its end. Fig. 2 is a longitudinal section of the box, and shows also a portion of an axle. Fig. 3 is an end view of an axle-nut. Fig. 4 is a side view and central section of a washer. Fig. 5 shows a washer having a raised and beveled central part.

The invention will be understood, as hereinafter set forth and claimed.

To enable others to avail themselves of my improvements on the expiration of the patent, I will give a detailed description of the same.

A is a portion of a carriage-axle, made in the usual form, and has its outer or threaded end, usually called "nib," made smaller than its bearing $a$, whereby the shoulder $b$ is formed. The nib has the flat part $c$, to prevent the turning of the washer, which is fitted to it, as shown in Fig. 4, in case a washer is used.

B is the box, which differs in no particular from the common box, except that it is made longer than the bearing $a$ and extends over a portion of the nib, as shown in section in Fig. 2.

D is the nut, which has the circular part $d$, the circular and raised part $c$, and the raised parts $f$ and $g$. The nut is threaded, and all its parts are cast in one piece. In the part $f$ a transverse slot is made which extends below the center of the hole in the nut, or far enough to allow the part $m$ to spring by the action of the screw $x$. The slot need not exceed the sixteenth of an inch in width. The screw $x$ passes through a hole in the part $m$ into a threaded hole in the part $n$. The turning of the screw $x$ draws the part $m$ toward the part $n$ and makes the threads in the part or side of the nut having the screw pinch and bind the threads on the nib, with which they are in contact, and effectually prevents the turning of the nut.

Instead of a transverse slot, a longitudinal slot may be made in the nut and cut through into the hole in the nut. The holes in which the screw is inserted will then be made in a transverse direction.

In Fig. 4 a side view and a central section of a washer are shown, in which a recess is made for the insertion of leather or other material to come against the end of the box. A like recess may be made in the nut for the same purpose, in case no washer is used; but I prefer to have metal surfaces in contact.

In Fig. 5 a washer having a raised and beveled part is shown, which makes a nice joint when the end of the box is made to fit it.

Constructed as above described and as shown, the screw $x$ being loosened, the nut can be turned up to prevent too much play of the box lengthwise, arising from wear, and again parted by the screw.

Having described my invention, what I claim as new, and desire to secure by Letters Patent, is—

The combination, with the bearing $a$ and box B, of the nut D, provided with the raised parts $e f g$, $f$ and $g$ forming projections or wings, and having a slot cut partially through the raised parts, and a screw, $x$, substantially as set forth.

In testimony whereof I affix my signature in presence of two witnesses.

FRANCIS D. BLISS.

Witnesses:
GEORGE TERRY,
DANIEL S. GLENNEY, Jr.